United States Patent [19]

Meixner et al.

[11] 4,030,773
[45] June 21, 1977

[54] FENDER, ESPECIALLY REAR FENDER FOR PASSENGER MOTOR VEHICLES

[75] Inventors: Rudolf Meixner, Sindelfingen; Günter Kling, Boblingen, both of Germany

[73] Assignee: Daimler-Benz Aktiengesellschaft, Germany

[22] Filed: June 9, 1975

[21] Appl. No.: 584,861

[30] Foreign Application Priority Data

June 12, 1974 Germany .......................... 2428477

[52] U.S. Cl. .......................................... 280/153 R
[51] Int. Cl.² ........................................ B62D 25/16
[58] Field of Search ............... 280/154.5 R, 152 R, 280/153 R, 153.5; 296/28

[56] References Cited

UNITED STATES PATENTS

| 2,073,058 | 3/1937 | Greene | 280/153 R |
| 2,313,587 | 3/1943 | Saurer | 280/152 |
| 2,866,652 | 12/1958 | Schatzman | 280/153 R |

FOREIGN PATENTS OR APPLICATIONS 66,712  11/1950  Netherlands ..................... 280/152

*Primary Examiner*—Stanley H. Tollberg
*Assistant Examiner*—Norman L. Stack, Jr.
*Attorney, Agent, or Firm*—Craig & Antonelli

[57] ABSTRACT

A fender, especially a rear fender for passenger motor vehicles which consists of an upper part and of a lower part separated by a separating plane extending at least approximately horizontally; the upper part is thereby non-detachably connected with the vehicle while the lower part is detachably connected with the vehicle.

13 Claims, 4 Drawing Figures

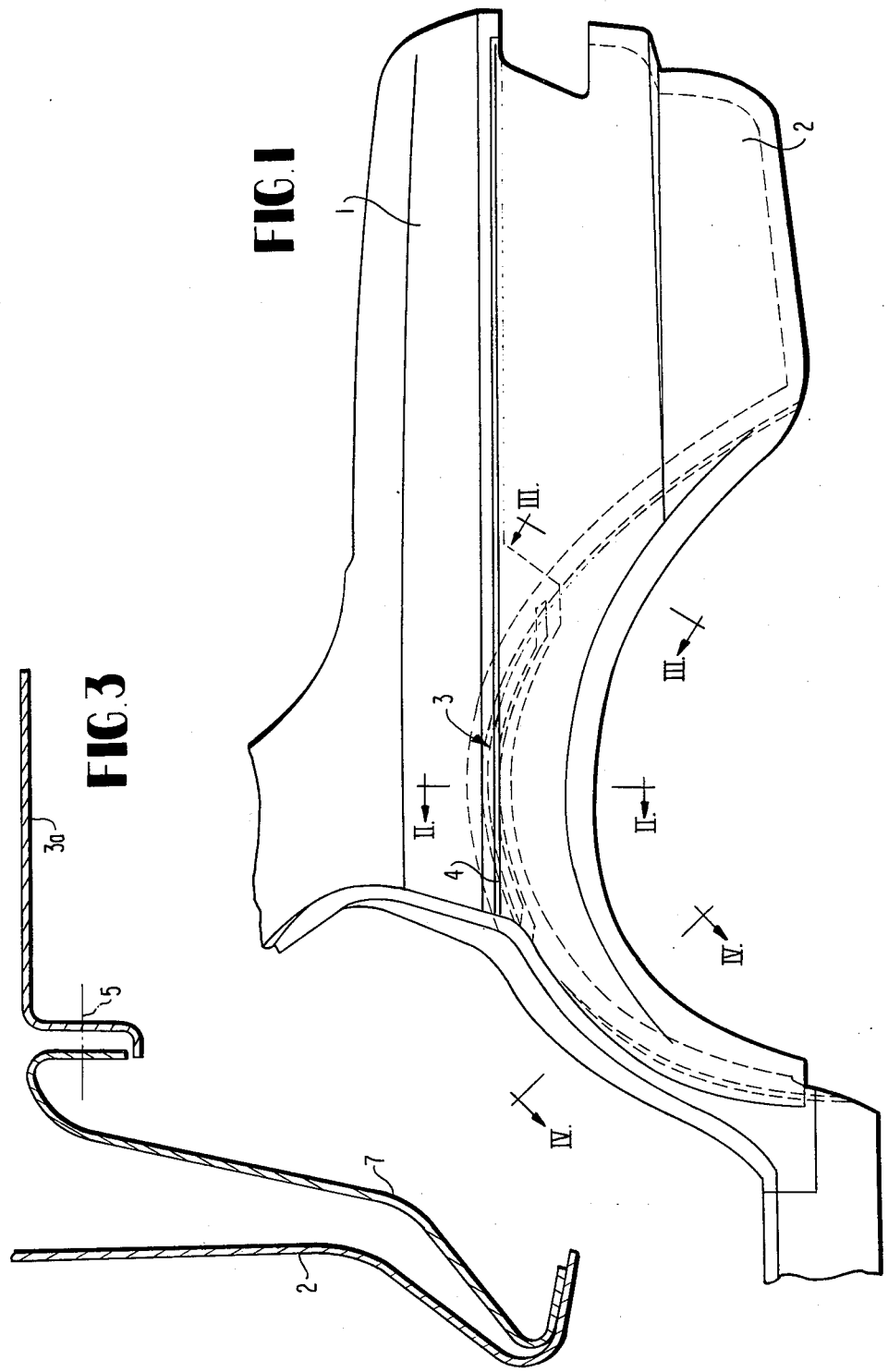

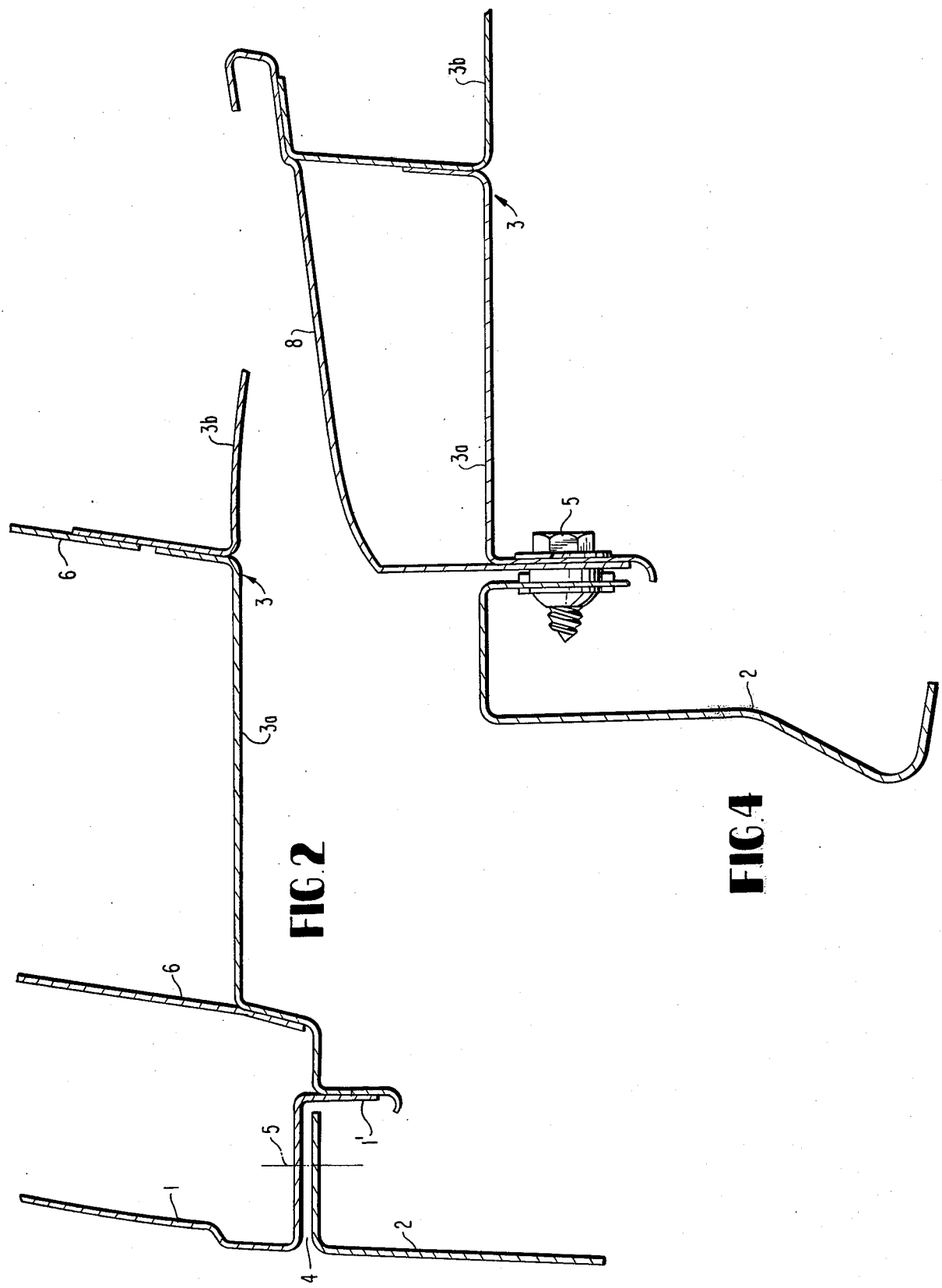

FENDER, ESPECIALLY REAR FENDER FOR PASSENGER MOTOR VEHICLES

The present invention relates to fenders and more particularly to rear fenders for passenger motor vehicles.

In modern bodies of passenger motor vehicles, the fenders are frequently welded together with the body for several reasons, such as, for example, simplified manufacture and increased rigidity of the body. This, however, means that an exchange of such a fender, for example, after an accident, is an extraordinarily work-intensive operation which is connected with corresponding high salary costs.

The present invention is therefore concerned with the task to achieve to the greatest possible extent, the advantages of bolted-on and welded-on fenders without having to thereby accept the respective disadvantages thereof.

Consequently, a fender, especially a rear fender for passenger motor vehicles is proposed which, according to the present invention, consists of an upper portion and of a lower portion, whereby the separating plane extends at least approximately horizontally, and whereby the upper part is non-detachably connected with the vehicle, for example, by welding, and the lower part is detachably connected with the vehicle, for example, by a threaded connection.

More particularly, observations have shown that in case of lighter accidents, as occur predominantly, for example, in city traffic, frequently only the lower half of a fender is damaged so that an exchange of the entire structural part would not be necessary at all as such.

It is particularly advantageous in this regard if the horizontal separating plane lies approximately at the height of the top or apex line of the wheel casing.

It is additionally advantageous for purposes of providing a seal with respect to the vehicle if an inwardly disposed sheet metal closure member is rigidly connected with the lower part of the fender whereby the closure member is threadably connected with the wheel casing.

A particularly favorable construction of a rear fender results if its lower part is screwed together with a folded sheet metal member and with an outer portion of the wheel casing within the area of the vehicle ingress, and if the sheet metal fold member forms together with the parts of the wheel casing a hollow bearer which serves the purpose of the connection of the rear column with the lower longitudinal bearer.

The separating joint between the upper part and the lower part of a fender according to the present invention is preferably constructed as visible gap and is covered off by a decorative strip or the like.

Accordingly, it is an object of the present invention to provide a fender, especially a rear fender for passenger motor vehicles which avoids by simple means the aforementioned shortcomings and drawbacks encountered in the prior art.

Another object of the present invention resides in a fender, especially a rear fender for passenger motor vehicles which facilitates the exchange of the fender in case of minor accidents without involving time-consuming and costly operations.

A further object of the present invention resides in a fender for a motor vehicle in which the advantages of bolted-on and welded-on fenders are attainable without the disadvantages thereof.

Still a further object of the present invention resides in a fender construction of the type described above which permits facilitated exchange of parts thereof, assures a tight seal with respect to the remaining vehicle and is relatively simple in construction.

These and other objects, features and advantages of the present invention will become more apparent from the following description when taken in connection with the accompanying drawing which shows, for purposes of illustration only, one embodiment in accordance with the present invention, and wherein:

FIG. 1 is a partial side view of a rear fender of subdivided construction in accordance with the present invention for a passenger motor vehicle;

FIG. 2 is a cross-sectional view, on an enlarged scale, taken along line II—II in FIG. 1;

FIG. 3 is a cross-sectional view, at the same scale as FIG. 2, taken along line III—III in FIG. 1; and FIG. 4 is a cross-sectional view, at the same scale as FIGS. 2 and 3, and taken along line IV—IV in FIG. 1.

Referring now to the drawing wherein like reference numerals are used throughout the various views to designate like parts, the rear fender illustrated in the drawing of a passenger motor vehicle consists of an upper part 1 and of a lower part 2 whereby the upper part 1 is welded on and the lower part 2 is fastened by a threaded connection, for example, by the use of threaded bolts, screws or the like. The separating plane between the upper part 1 and the lower part 2 extends horizontally and lies approximately at the height of the apex line of the wheel casing generally designated by reference numeral 3; the wheel casing 3 itself is formed by an outer portion 3a and by an inner portion 3b (FIG. 2). The gap 4 disposed in the separating plane between the upper part 1 and the lower part 2 is constructed as visible gap and is covered off during the final assembly of the vehicle by a decorative strip or the like (not shown) in a conventional manner.

The threaded connections which are indicated only schematically in part, are designated respectively by reference numeral 5 in FIGS. 2, 3, and 4.

As can be seen from FIG. 2 of the drawing, the upper part 1 of the fender is non-detachably connected with the outer portion 3a of the wheel casing 3 by means of an angularly bent area 1' thereof whereby parts of the rear column 6 are again connected at the wheel casing 3 as shown in FIG. 2. Within the upper area of the upper part 1 of the fender, the connection with the rear column, the rear center portion at the top and the rear center portion to the rear remains preserved in the customary manner and therefore not illustrated in detail in the drawing.

FIG. 3 of the drawing illustrates the sheet metal closure member or panel 7 provided only in the rear portion of the body structure within the area of the wheel; the sheet metal closure member 7 thereby serves the purpose of providing a seal with respect to the luggage space of the vehicle such as to close that space from the environment. The sheet metal closure member 7 is rigidly connected, for example, by spot-welding, with the lower part 2 of the fender within the wheel cut-out arc and is threadably connected with the outer portion 3a of the wheel casing. Sheet metal screws or bolts and insertable sheet metal nuts may be used for all threaded connections mentioned herein so that threaded connections can also be realized without difficulties if the nut is not accessible, for example, in a hollow space. Of course, any other conventional type of threaded connection may also be used.

Finally, the construction of a fender within the area of the ingress of a passenger motor vehicle can be seen from FIG. 4. The lower part 2 of the fender is thereby threadably connected with the sheet metal fold member 8 covering the ingress and with the portion 3a of the wheel casing 3 which together with the sheet metal fold member 8 and the inner portion 3b of the wheel casing 3 forms a hollow body which serves for the connection of the rear column with the longitudinal bearer underneath the ingress.

While we have shown and described only one embodiment in accordance with the present invention, it is understood that the same is not limited thereto but is susceptible of numerous changes and modifications as known to those skilled in the art, and we therefore do not wish to be limited to the details shown and described herein but intend to cover all such changes and modifications as are encompassed by the scope of the appended claims.

We claim:

1. In a fender construction for a wheeled vehicle having a body of the type including wheel casing means, an improved fender construction comprising an upper fender part non-detachably connected to said vehicle, a separate lower fender part detachably connected to said vehicle, said upper fender part and said lower fender part being disposed with adjacent portions along an approximately horizontal separation plane over the longitudinal length of the fender parts, and an inwardly disposed sheet metal closure member arranged within a portion of said lower fender part, said sheet metal closure member being non-detachably rigidly connected to said lower fender part and detachably threadedly connected to said wheel casing means, wherein said sheet metal closure member provides a seal with respect to a portion of said vehicle body such as to seal the body portion from the environment.

2. A fender construction according to claim 1 wherein said upper fender part is non-detachably rigidly connected to a portion of said wheel casing means.

3. A fender construction according to claim 2, wherein said separate lower fender part is detachably threadedly connected to a flange portion of said upper fender part.

4. A fender construction according to claim 3, wherein said separate lower fender part is further detachably threadedly connected to a portion of said wheel casing means.

5. A fender construction according to claim 4 for a rear fender of said vehicle body, wherein said separate lower fender part is detachably threadedly connected to both said portion of said wheel casing means and a second sheet metal member forming a hollow bearer with said wheel casing means, said hollow bearer serving to connect a rear column of said vehicle body with a lower longitudinal frame member of said vehicle.

6. A fender construction according to claim 1, wherein said upper fender part is non-detachably welded to said vehicle, and said separate lower fender part is detachably threadedly connected to said vehicle.

7. A fender construction according to claim 1, wherein said horizontal separating line is located approximately at the height of the apex line of said wheel casing means.

8. A fender construction according to claim 1, wherein said upper fender part and said separate lower fender part are adjacently disposed with a visible gap along said horizontal separation plane.

9. A fender construction according to claim 8, wherein said visible gap is covered by a decorative strip.

10. A fender construction according to claim 1, wherein said separate lower fender part is detachably threadedly connected to a portion of said wheel casing means.

11. A fender construction according to claim 10 for a rear fender of said vehicle body, wherein said separate lower fender part is detachably threadedly connected to both said portion of said wheel casing means and a second sheet metal member forming a hollow bearer with said wheel casing means, said hollow bearer serving to connect a rear column of said vehicle body with a lower longitudinal frame member of said vehicle.

12. A fender construction according to claim 1, wherein said sheet metal closure member is arranged within a rear portion of said separate lower fender part.

13. A fender construction according to claim 1, wherein said separate lower fender part is detachably threadedly connected to said vehicle by means of sheet metal screws.

* * * * *